Figure 1:
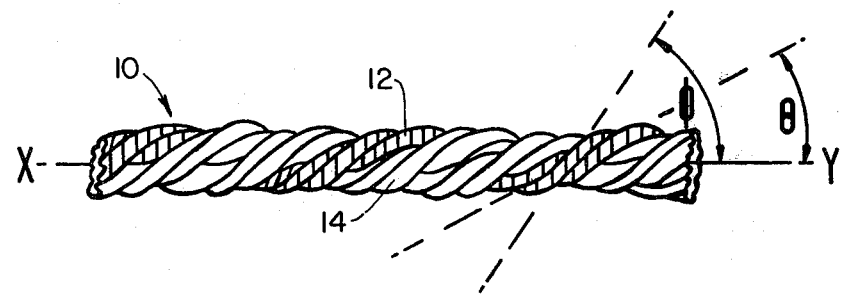

United States Patent [19]

Young et al.

[11] 4,176,513

[45] Dec. 4, 1979

[54] STEEL WIRE CORD

[75] Inventors: Maurice A. Young, Sutton Coldfield, England; Leonhard W. Hamacher, Bruchköobel-Niederissigheim, Fed. Rep. of Germany

[73] Assignee: Dunlop Limited, London, England

[21] Appl. No.: 829,976

[22] Filed: Sep. 1, 1977

[30] Foreign Application Priority Data

Sep. 7, 1976 [GB] United Kingdom ............... 36917/76

[51] Int. Cl.² .......................... D02G 3/48; D07B 1/06
[52] U.S. Cl. ....................................... 57/237; 57/218; 57/902; 152/359
[58] Field of Search .................... 57/9, 139, 144, 145, 57/148, 156, 160, 166, 212, 213, 214, 218, 236, 237, 902; 72/274; 152/356 R, 359, 361 R, 362 R

[56] References Cited

U.S. PATENT DOCUMENTS

| Re. 29,537 | 2/1978 | Adams | 57/148 |
|---|---|---|---|
| 2,195,592 | 4/1940 | Jones | 57/144 |
| 2,598,033 | 5/1952 | Bourdon | 57/144 |
| 2,767,836 | 10/1956 | Nachtman et al. | 57/145 UX |
| 3,090,189 | 5/1963 | Boussu et al. | 57/139 |
| 3,243,338 | 3/1966 | Jackson | 57/144 X |
| 3,306,022 | 2/1967 | Stevens | 57/148 |
| 3,395,528 | 8/1968 | Lucht | 57/166 X |
| 3,600,884 | 8/1971 | Yazawa et al. | 57/145 X |
| 3,805,508 | 4/1974 | Maderna | 57/145 |
| 4,020,887 | 5/1977 | Vlasov et al. | 152/359 |

FOREIGN PATENT DOCUMENTS

| 1348290 | 11/1963 | France | 57/148 |
|---|---|---|---|
| 1381072 | 3/1964 | France . | |
| 2005993 | 4/1968 | France . | |
| 2077770 | 5/1971 | France . | |
| 2173628 | 5/1973 | France . | |

*Primary Examiner*—Donald Watkins
*Attorney, Agent, or Firm*—Stevens, Davis, Miller & Mosher

[57] ABSTRACT

A steel wire cord which comprises an assembly of strands each of which comprises a plurality of filaments of steel, said filaments having been drawn to give a reduction in their cross-sectional area of less than 96%, the strand helix angle being not less than 40° and the filament helix angle being not less than 20°.

13 Claims, 2 Drawing Figures

U.S. Patent

Dec. 4, 1979

4,176,513

STEEL WIRE CORD

This invention relates to steel wire cords and in particular to steel wire cords having high extensibility which may be used for reinforcing elastomeric articles, especially tires.

In radial tires which are manufactured for high speed vehicles it is usual to use a breaker or tread reinforcing belt of steel cords. This belt is often of folded edge construction and is built up of layers of parallel cords having relatively high twists compared with the majority of cords used in tires reinforcement.

Because of the type of breaker design in use and the requirements of the tires, the breaker or belt is highly stressed in service and it is quite common for fatigue failures to occur within the cord structure due to compression of the cords. This compression stressing may be due to local discontinuities in modulus or thickness of the materials across the width of the breaker or belt in the tires.

In the manufacture of fine steel wires a series of stages of drawing followed by heat treatment are used. The heat treatment reforms the internal structure of the steel enabling further drawing to be carried out. The process of heat treating is known as "patenting." In the manufacture of fine wire for steel tires cord a patenting operation preceeds final drawing.

Steel cords for use in tires are assembled from filaments of fine diameter wires (typically 0.15 mm diameter) which have been drawn from larger diameter wires so that the properties and in particular the tensile strength are maximized. Typically, a 0.87 mm diameter wire, after "patenting" is drawn to form a 0.15 mm diameter wire which, following the resulting 97% cross-sectional area reduction, has a filament tensile strength of about 280 Kg/square mm. It is well known that reductions of cross-sectional area of, say, 1% result in at least a 5% increase in tensile strength of the filaments and thus the strength of the resultant cords which utilize standard degrees of twist or lay.

The present invention provides a cord having certain improved properties particularly useful in reinforcing elastomeric articles such as tires, the improvement being obtained by limiting the reduction in cross-sectional area of the wire in drawing after "patenting" or heat treatment.

According to one aspect of the present invention, a steel wire cord comprises an assembly of strands each of which comprises a plurality of filaments of steel, said filaments having been drawn to give a reduction in their cross-sectional area (as hereinafter defined) of less than 96%, the strand helix angle (as hereinafter defined) being not less than 20° and the filament helix angle (as hereinafter defined) being not less than 40°.

In this specification, reference to the reduction of cross-sectional area of less than 96% refers to the reduction obtained after the (or the last) "patenting" or heat treatment process.

As used herein, the term "strand helix angle" is the angle between the tangent to the strand helix and the longitudinal axis of the cord; and the term "filament helix angle" is the angle between the tangent to the filament helix and the longitudinal axis of the cord of which the filament is a constituent.

The strand helix angle is preferably in the range from 20° to 30°. The filament helix angle is preferably in the range 50° to 60°.

The reduction in cross-sectional area is preferably in the range 90–96%, especially 95–96%. Preferably, the lay of the cord is a Lang's lay. Cords of the invention have been found to have improved breaking load, elongation at break, elongation at a load less than the breaking load, and improved flexibility.

Another aspect of the present invention provides a cord as described above embedded in elastomeric material and in particular vulcanized in rubber.

Still another aspect provides a tire reinforced by said cords. The vulcanized cord was found to have even further improvements in the above three properties when compared with a similar cord made from normally drawn filaments and these improvements were reflected in tires made with the cords.

Figure 2:
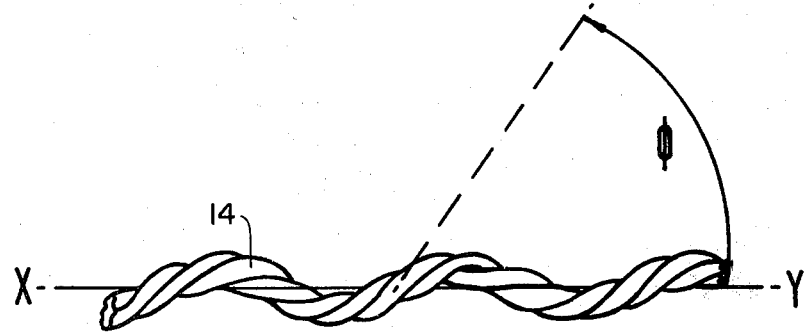

One embodiment of the present invention will now be described by way of example with reference to the accompanying drawings in which:

FIG. 1 is an elevational view of a length of steel wire cord in which one of the constituent strands is shown shaded; and, FIG. 2 is an elevational view of one of the strands of FIG. 1.

An example of a steel wire cord of this invention is as follows:

EXAMPLE

Steel wires of 0.87 mm diameter were brass plated preparatory to drawing. The steel composition was as follows:

Carbon: 0.67–0.72%
Manganese: 0.40–0.70%
Silicon: 0.25% max
Phosphorous: 0.025% max
Sulphur: 0.025% max
Copper: 0.01%
Chromium: 0.02%

(Such a steel is a typical steel to provide a filament strength of the order of 280 Kg/square mm).

The wire was drawn into filaments having a diameter of 0.175 mm and the process was then stopped giving a reduction of cross-sectional area of 95.95%. The wire filaments were then made into a high extensibility cord 10 of Lang's lay construction. It was of a 3×3×0.175 mm construction (i.e. each cord consisted of three strands each of which consisted of three filaments of 0.175 mm diameter), the lay of filaments in the strand being 1.40±0.1 mm in the 'S' direction and the lay of strands in the cord being 2.55±0.1 mm in the 'S' direction. The helix angles of the filaments in the strands and of the strands in the cord, are respectively: 55±2° (corresponding to the lay of 1.40±0.1 mm) and 27½±1° (corresponding to the lay of 2.55±0.1 mm).

In the accompanying drawings FIG. 1 is an elevation of a length of the steel wire cord 10 in which one of the constituent strands is shown shaded: and FIG. 2 is an elevation of a length of one of the constituent strands 12 of cord 10. Both drawings were obtained by tracing photomicrographs. The strand shown in FIG. 2 was as obtained by unwinding cord 10. In the drawings the line x-y represents the longitudinal axis of the cord, and the angles $\theta$ and $\phi$ are respectively the strand helix angle and the filament helix angle, both as hereinbefore defined.

A similar cord (B) was made from plated steel wire of the same composition and diameter as that used for cord 10 (column (A) in the table below) but which had been drawn from wire of 0.92 mm diameter giving a reduction of cross-sectional area of 96.36%.

The cord properties were measured and found to be:

|  | Cord | |
| --- | --- | --- |
|  | (A) | (B) |
| Breaking load (kg force) | 36.8 | 34.4 |
| Elongation at break (%) | 9.8 | 7.6 |
| Elongation at 20 kg force (%) | 2.6 | 2.2 |
| Stiffness (Taber test) (g.cm) | 8.2 | 9.5 |
| Linear density (K.tex)* | 1.876 | 1.922 |
| Diameter (mm) | 0.76 | 0.79 |

*Weight in kilograms of 1000 metres of cord.

Cords (A) and (B) vulcanized in rubber and then tested had the following properties:

|  | (A) | (B) |
| --- | --- | --- |
| Breaking load (kg force) | 39.1 | 36.2 |
| Elongation at break (%) | 7.2 | 3.8 |
| Elongation at 20 kg force (%) | 2.0 | 1.5 |

The resultant cord (A) thus had improved properties suitable for use in tires. Test tires containing a breaker comprising cords (A) and subjected to a normal structural overload test showed no structural failure after identical tires reinforced by cord (B) had failed.

What we claim is:

1. A steel wire cord which comprises an assembly of strands each having a plurality of filaments of steel, said filaments having been drawn, after at least one heat treatment, to give a reduction in their cross-sectional area after the last heat treatment, of less than 96%, the strand helix angle being not less than 20° and the filament helix angle being not less than 40°.

2. A steel wire cord according to claim 1, in which the strand helix angle is in the range from 20° to 30°.

3. A steel wire cord according to claim 1 in which the filament helix angle is in the range from 50° to 60°.

4. A steel wire cord according to claim 1, in which the strand helix angle and the filament helix angle are substantially the same as those obtained using a 3×3×0.175 mm Lang's lay construction where the lay of strands in the cord is less than 3.0 mm and the lay of filaments in the strands is less than 1.5 mm.

5. A steel wire cord according to claim 1 in which said reduction in cross-sectional area is in the range 90–96%.

6. A steel wire cord according to claim 5, in which said reduction in cross-sectional area is in the range 95–96%.

7. A steel wire cord according to claim 1 which is of a Lang's lay construction.

8. A steel wire cord according to claim 1 in which the diameter of the wire before drawing is in the range 0.75 to 1 mm.

9. A steel wire cord according to claim 1 in which the steel is a manganese steel.

10. A steel wire cord according to claim 9, in which the steel contains 0.67–0.72%, 0.4–0.7% manganese, 0.25% (maximum) silicon, 0.025% (maximum) phosphorus, 0.025% (maximum) sulphur, 0.01% copper and 0.02% chromium.

11. A steel wire cord according to claim 1 which has been embedded in an elastomeric material.

12. A vehicle tire containing as reinforcement a steel wire cord as claimed in claim 1.

13. A steel wire cord reinforced elastomeric article which comprises an assembly of strands each having a plurality of filaments of steel, said filaments having been drawn after at least one heat treatment, to give a reduction in their cross-sectional area after the last heat treatment in the range of 95% to 96%, the strand helix angle being not less than 20° and the filament helix angle being not less than 40°, said assembly of strands being embedded in elastomeric material to form a reinforcement thereof.

* * * * *